Figures 1, 2:
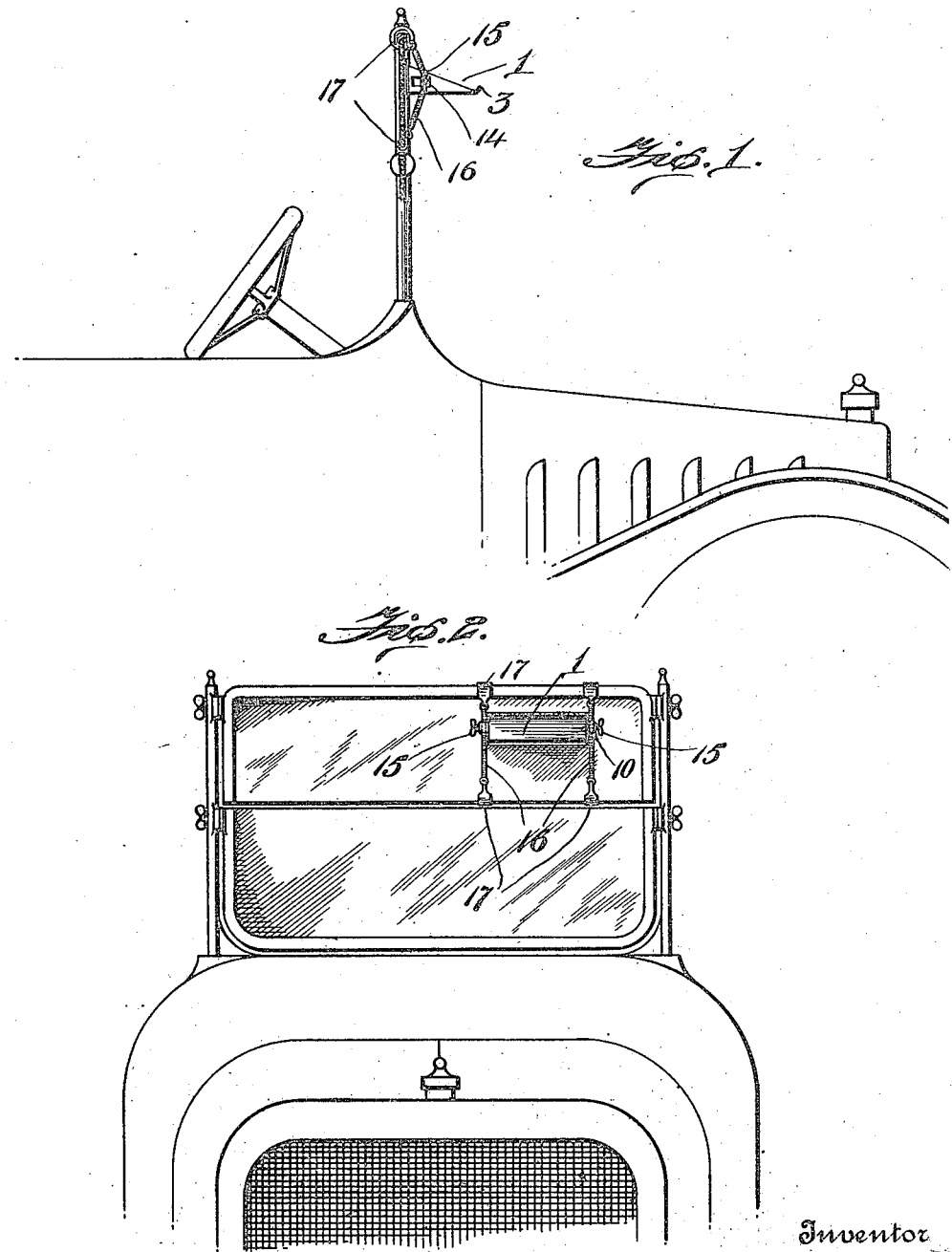

R. B. OSTERHOUDT.
GUARD FOR WIND SHIELDS AND THE LIKE.
APPLICATION FILED JULY 1, 1915.

1,168,108.

Patented Jan. 11, 1916.
2 SHEETS—SHEET 1.

Witnesses

Inventor
Rodney B. Osterhoudt
By
Attorneys

R. B. OSTERHOUDT.
GUARD FOR WIND SHIELDS AND THE LIKE.
APPLICATION FILED JULY 1, 1915.
1,168,108.
Patented Jan. 11, 1916.
2 SHEETS—SHEET 2.
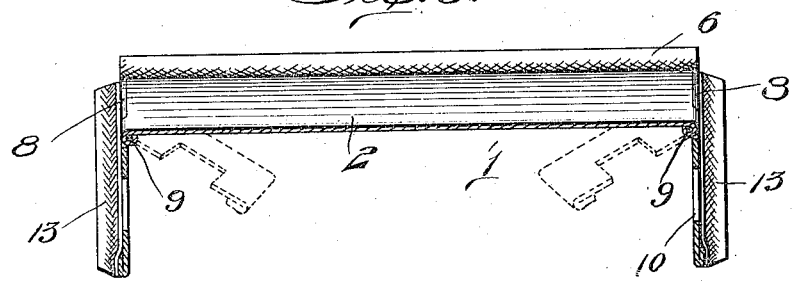
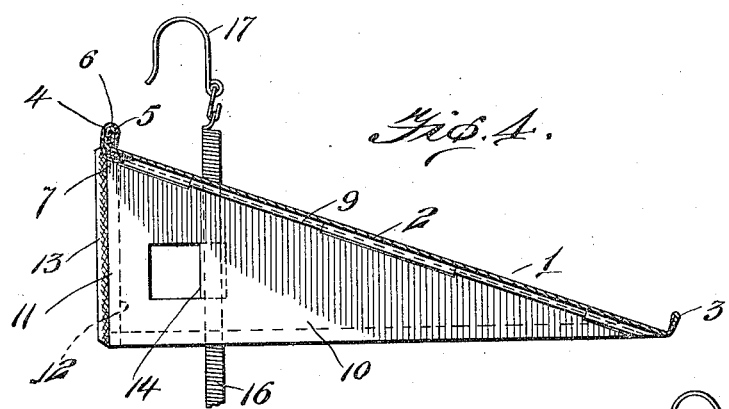
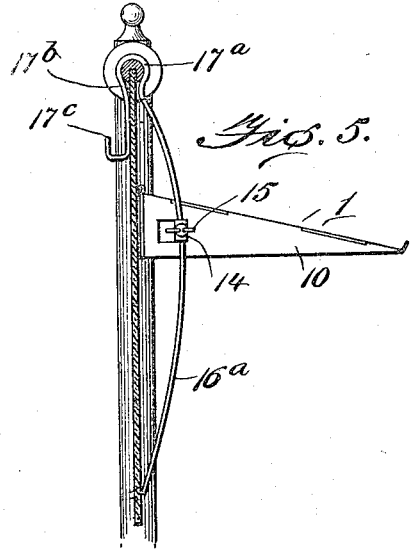
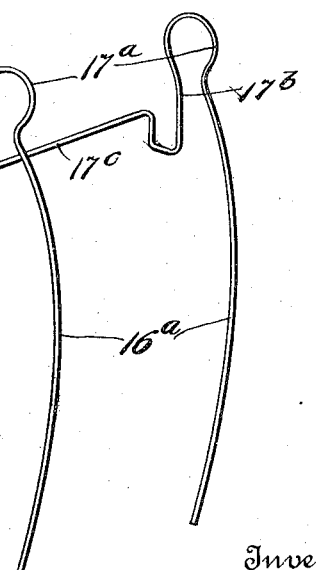
Inventor
Rodney B. Osterhoudt
Attorneys

UNITED STATES PATENT OFFICE.

RODNEY B. OSTERHOUDT, OF KINGSTON, NEW YORK.

GUARD FOR WIND-SHIELDS AND THE LIKE.

1,168,108.  Specification of Letters Patent.  Patented Jan. 11, 1916.

Application filed July 1, 1915. Serial No. 37,471.

*To all whom it may concern:*

Be it known that I, RODNEY B. OSTERHOUDT, a citizen of the United States, residing at Kingston, in the county of Ulster and State of New York, have invented certain new and useful Improvements in Guards for Wind-Shields and the like; and I do declare the following to be a full, clear, and exact description of the invention, such as will enable others skilled in the art to which it appertains to make and use the same.

My invention relates to a device for preventing the accumulation of rain, sleet or the like upon the wind shields of automobiles, or upon the transparent front windows of locomotive cabs, electric railway cars and analogous vehicles.

The object of the invention is to provide a device of this class which, although being very simple, inexpensive, and compact when not in use, will be highly efficient and durable.

With this general object in view, the invention resides in certain novel features of construction and in unique combinations of parts to be hereinafter fully described and claimed, the descriptive matter being augmented by the accompanying drawings in which similar reference characters designate corresponding parts throughout the several views and wherein:

Figure 1 is a side elevation of a portion of an automobile showing the application of the invention to the wind shield thereof; Fig. 2 is a front end view of the machine with the invention applied; Fig. 3 is a longitudinal sectional view of the device detached from the machine; Fig. 4 is a transverse section thereof; Fig. 5 is a view similar to Fig. 1, showing slightly different attaching means for the guard; and Fig. 6 is a perspective view of such means.

Throughout the several figures of the drawings, the numeral 1 designates a roof-like guard for disposition in advance of the wind shield or the like of an automobile or other type of vehicle, such guard being shown in the present embodiment of the invention as comprising an inclined rectangular plate 2 having its lower edge bent upwardly as disclosed at 3 to provide a gutter discharging at the opposite side edges of the plate. The upper end of the plate 2 is also shown as bent upwardly to provide a gripping flange 4 which is bent upon itself to provide an additional gripping flange 5, one edge of a packing strip 6, of rubber or the like, being clamped between the two flanges 4 and 5 and being curled upwardly and rearwardly around said flanges as clearly disclosed in Fig. 3, the other edge of said strip being anchored between a pair of gripping flanges 7 which are shown in the present embodiment of the invention as formed integrally with each other and as soldered or otherwise secured to the plate 2.

Having their hypotenuses 8 hinged at 9 to the inclined side edges of the plate 2 is a pair of right angle triangular gable sections 10, the altitudes 11 of these sections being disposed in the plane of the rear edge of the aforesaid plate 2 and being suitably crimped at 12 for the retention of upright packing strips 13 which coact with the strip 6 in a manner to become evident as the description proceeds.

Constructed in any appropriate manner, but in the present application shown as being formed by striking portions of the gable sections 10 outwardly, is a pair of upright tubular guides 14, one of which is carried by each of said sections. These guides are preferably provided with set screws or the like 15, whereby the guard 1 may be secured in vertically adjusted relation upon vehicle springs designed for engagement with the wind shield.

The springs just referred to are shown in Figs. 1 to 4 at 16, being of helical design. Such springs normally stand upright and are inserted through the guides 14, the upper and lower ends of said springs being equipped with appropriate hooks 17 for engagement with the upper and lower edges of the wind shield, if the device be applied to an automobile. If application of the invention is to be made to transparent panels other than those carried by an automobile, the hooks 17 may be replaced by other appropriate attaching members with which the present application need not be encumbered.

In applying the guard 1 to use when employing the springs 16, the gable sections 10 are swung downwardly to right angular relation in respect to the plate 2 and the device is positioned above the driver's view area, in which position the packing strips 6 and 13 contact with the wind shield and are held in such contact by the resiliency of the springs 16 which, although normally standing upright, are sprung rearwardly when the hooks 17 are engaged with the edges of the shield, thus placing said springs under tension.

When the use of the device is not necessary, the latter may be readily detached whereupon the gable sections 10 may be folded toward the plate 2, thus providing an extremely compact article for storing within the machine until its use again becomes expedient.

In Figs. 5 and 6, a pair of upright springs 16$^a$ are shown in the form of resilient rods inserted through the guides 14, the upper ends of said springs being bent rearwardly and downwardly upon themselves as seen at 17$^a$, whereby to provide hooks 17$^b$ for engagement with the upper frame bar of the wind shield, the bills of these hooks being preferably bent upwardly and rearwardly and connected by a transverse bar 17$^c$. In the present embodiment of the invention, the parts 16$^a$, 17$^b$ and 17$^c$ are all shown as formed of a single resilient wire, but it will be obvious that although this construction is preferable, the two springs 16$^a$ and their hooks 17$^b$ might well be disconnected.

The type of the invention just described is foldable in the same manner as that previously detailed, but needless to say, it is first necessary to remove the springs 17$^a$ if the bar 17$^c$ is used.

Regardless of the manner in which the guard 1 is secured in position in advance of the shield, it will effectively prevent the accumulation of rain, snow or sleet thereon and will thus at all times provide a clear area on said shield through which the vision of the driver will be unobstructed.

From the foregoing description, taken in connection with the accompanying drawings, it will be evident that although extremely simple and inexpensive construction has been provided for carrying out the object of the invention, the device will be highly efficient and durable and will possess a number of advantageous characteristics.

In the drawings, certain specific details of construction have been shown for accomplishing probably the best results, and in the preceding such details have been described, but it will be evident that I need not be restricted thereto otherwise than to the extent to which the appended claims limit me.

I claim:—

1. A wind shield protector comprising an inclined roof plate having a packing strip at its upper edge for contact with a wind shield, a pair of gables depending from the inclined edges of said plate and also having packing strips at their rear edges for contact with the shield, a pair of upright tubular guides carried one by each gable and disposed adjacent the rear edges thereof, a pair of upright springs received slidably in said tubular guides, hooks 1 the upper ends of the springs for engagement with the upper edge of the wind shield, and set screws threaded through the guides into contact with the springs.

2. A wind shield protector comprising an inclined roof plate having a packing strip at its upper edge for contact with a wind shield, a pair of gables depending from the inclined edges of said plate and also having packing strips at their rear edges for contact with the shield, and a pair of upright tubular guides carried one by each gable and disposed adjacent the rear edges thereof, in combination with an attaching device formed of a single piece of wire having a substantially horizontal central portion and having its end portions directed upwardly at the ends of said central portion to form hook bills for engagement with the upper edge of the wind shield, said end portions being then bent forwardly and downwardly upon themselves and continued downwardly in parallel relation to form a pair of upright springs, the latter being received in the aforesaid tubular guides.

In testimony whereof I have hereunto set my hand in presence of two subscribing witnesses.

RODNEY B. OSTERHOUDT.

Witnesses:
 JOSEPH M. FOWLER,
 JOSEPHINE HARRIS.

Copies of this patent may be obtained for five cents each, by addressing the "Commissioner of Patents, Washington, D. C."